Oct. 9, 1973  W. J. SCHRENK  3,764,430
METHOD FOR MAKING A METALLIZED BARRIER STRUCTURE OR FILM
Filed Oct. 29, 1970
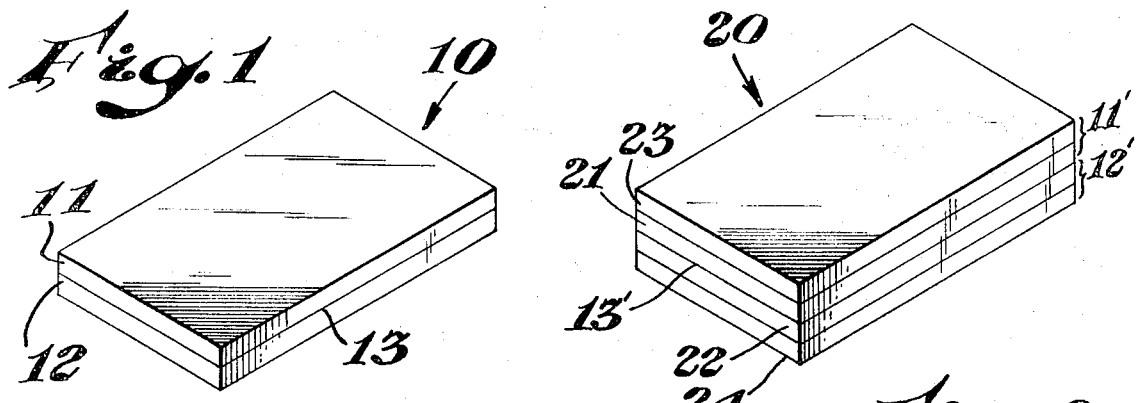
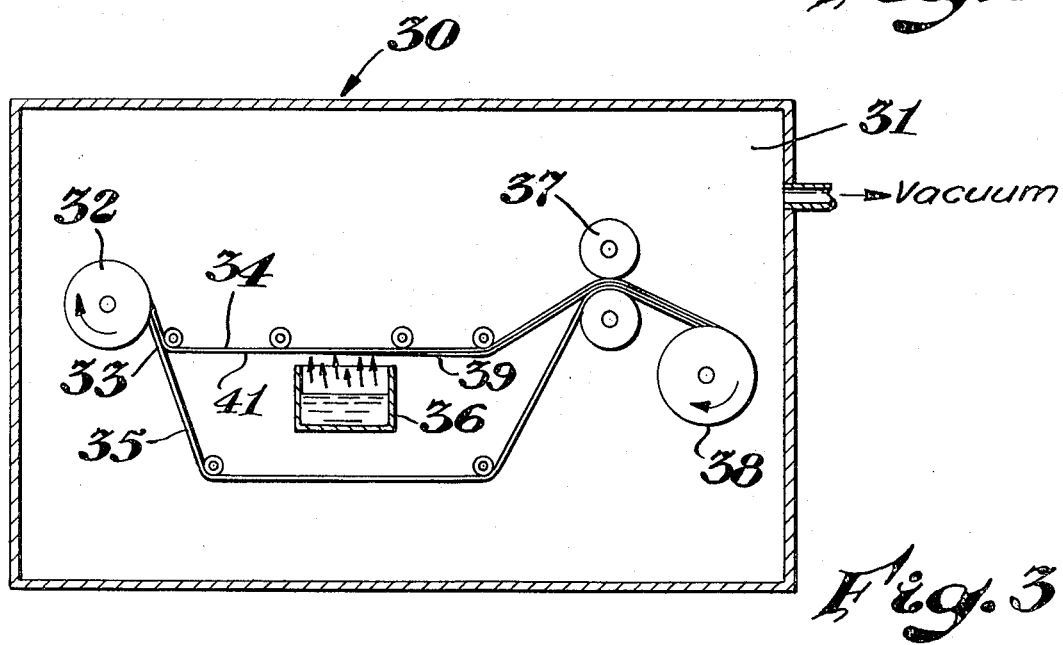
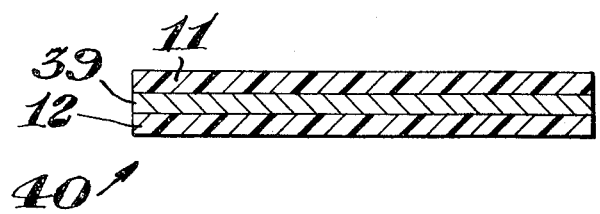
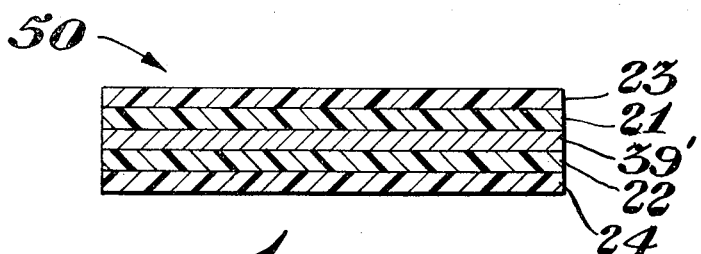
INVENTOR.
Walter J. Schrenk
BY
Griswold & Burdick
ATTORNEYS

United States Patent Office 3,764,430
Patented Oct. 9, 1973

3,764,430
METHOD FOR MAKING A METALLIZED BARRIER STRUCTURE OR FILM
Walter J. Schrenk, Bay City, Mich., assignor to The Dow Chemical Company, Midland, Mich.
Filed Oct. 29, 1970, Ser. No. 85,079
Int. Cl. B32b 31/00
U.S. Cl. 156—150                    22 Claims

ABSTRACT OF THE DISCLOSURE

A process for making packaging films and other structures having excellent gas and water vapor barrier characteristics. This process utilizes a multilayered film which is first separated into two webs of one or more layers. One inner layer surface of a web is then metallized. A composite metallized thermoplastic structure results from relamination after metallization. An important feature of this process is the selection of the two inner layers adjacent to the contacting interfaces of the webs from thermoplastic compositions which characteristically adhere poorly to each other but individually adhere well to metal.

BACKGROUND OF THE INVENTION

(1) Field of the invention

This invention relates to a thermoplastic metallic structure useful as a packaging material where vapor and/or gas barrier characteristics are needed, with particular reference to a process for making the thermoplastic metallic structure.

(2) Description of the prior art

In general, packaging of many food products or other articles requires a material which exhibits better barrier resistance to the transmission of gases or vapors than can be obtained by thermoplastic materials. To overcome this problem, metal layers can be used to provide the additional barrier characteristics needed. Useful metal layers in combination with thermoplastic layers can be prepared from vacuum vapor metallization, chemical vapor deposition, sputtering, thin foils, or other known means.

Many methods of laminating a metal foil, preferably aluminum, to a thermoplastic substrate material to form a high barrier plastic film composite are known. Although most metal foils may be laminated to a plastic substrate to make a composite film, they generally have defects such as pinholes which decrease the barrier resistance to the transmission of gases or vapors. Also due to the thickness of the foil, crumpling or bending during use frequently creates additional pinholes which causes the barrier properties to become poor.

A second well-known method of applying a metal layer to a thermoplastic substrate, which overcomes some of the pinhole problems of laminated metal foil, is the use of direct metal deposition such as vacuum vapor metallization. It is known that thin metal coating from 300 to 700 angstroms thick can be deposited on thermoplastic substrates by vacuum metallization which have barrier properties superior to a 0.35 mil metal foil laminated to the same thermoplastic substrates.

In order to achieve a plastic and metal composite film which has good barrier characteristics, thermoplastic substrate materials are selected which provide for good metal spreading and metal crystal growth during metallization. It is known that some plastic substrate materials require a surface treatment prior to metallization in order to achieve good metal spreading and crystal growth without grain boundary defects.

In addition to selecting a good thermoplastic substrate material, the surface to be metallized had to be kept very clean and free from foreign matter such as dust and fingerprints. Foreign matter of any kind on the surface to be metallized will create a defect in the metal layer.

It is known that the metal layer should be protected by overcoating with an additional thermoplastic layer to prevent scratching, abrasion, and chemical or water attack of the metal layer which results in reducing the overall barrier characteristics of the film composite. Also, it is known that the metal layer should be placed near the neutral axis of the film composite to prevent additional loss in barrier characteristics during use because of crumpling and bending.

After the basic plastic-metal-plastic composite film has been formed, it was usually necessary to laminate additional thermoplastic film layers to the outer surfaces thereof to provide for additional functional characteristics such as good heat sealing printability, appearance, or the like. These additional layers, as well as the substrate layer and the overcoat layer, were selected from thermoplastic compositions which provide good water vapor and gas barrier characteristics.

Heretofore, the methods use to make the composite films, as described above, have been very expensive due to the large number of independent steps involved and material losses incurred during processing. First, it has been necessary to form a substrate thermoplastic film with good water vapor and/or gas barrier properties which would accept good metal spreading and crystal growth during metallization. Second, it was necessary to metallize the thermoplastic substrate material which had to be kept very clean and free of foreign matter. Next, it was necessary to overcoat the metal layer with a protective thermoplastic layer. Finally, it was necessary to solution coat, laminate or extrusion coat the outer surfaces of the composite film with additional layers to provide for good heat sealing, printability, appearance or other characteristics.

SUMMARY

In general, the present invention provides a method of forming a plastic and metal composite film useful as a packaging material or other structure where water vapor and/or gas barrier properties are needed. Initially a plurality of layers are co-extruded, or otherwise formed and immediately laminated together. The two most inner plastic layers are formed from polymeric or copolymeric thermoplastic compositions which adhere poorly to each other but will individually adhere well to a metal layer. This step of the method is applicable to the formation of the two inner poorly adhering thermoplastic layers. However, additional remotely disposed outer layers including both plastic and non-plastic materials such as paper which will adhere securely to the two inner layers can also be simultaneously formed with an bonded to one or both of the inner layers. Both the inner and outer layers may be varied over a wide range with respect to composition, flexibility and thickness depending on the desired end-use characteristics.

The characteristic poor adhesion between the inner layers is defined herein as a range of adhesion which at the lower end is just sufficient to hold the two inner layers together before a subsequent step of delaminating or separating the inner layers and which at the upper end is just below an adhesion that will cause permanent deformation and loss of integrity of all the thermoplastic layers during a subsequent step of delaminating or separating the inner layers. The characteristic good adhesion between the inner layers and a metal layer is herein defined as that adhesion sufficient to make the final composite film functional during use. Preferably, the inner layers adhere to one another to a substantially lesser degree than they adhere to a metal layer.

There is an advantage in selecting one of the inner layers from a polymer or copolymer composition that exhibits good barrier characteristics to gases and water vapor. Particularly, suitable compositions are combinations of vinylidene chloride polymers, vinyl chloride polymers, vinylidene fluoride polymers, acrylonitrile polymers and copolymers thereof which form extrudable mixtures Vinylidene chloride polymers are generally most beneficial as they are readily available at a low cost. Beneficial extrudable compositions of vinylidene chloride polymers can be formed essentially at least 70 weight percent vinylidene chloride and a remainder of one or more olefinically unsaturated monomers copolymerizable therewith. Suitable copolymer compositions of vinylidene chloride are prepared utilizing such comonomers as methyl, ethyl, isobutyl, butyl, octyl and 2-ethylhexyl acrylates and methacrylates; phenyl methacrylate, cyclohexyl methacrylate, p-cyclohexylphenyl methacrylate, chloroethyl methacrylate, 2-nitro-2-methylpropyl methacrylate, and the corresponding esters of acrylic acid, methyl alpha-chloro-acrylate, octyl alpha-chloroacrylate, methyl isopropenyl ketone, acrylonitrile, methacrylonitrile, methyl vinyl ketone, vinyl chloride, vinyl acetate, vinyl propionate, vinyl chloroacetate, vinyl bromide, styrene, vinyl naphthalene, ethyl vinyl ether, N-vinyl phthalimide, N-vinyl succinimide, N-vinyl carbazole, isopropenyl acetate, acrylamide, methacrylamide or monoalkyl substitution products thereof, phenyl vinyl ketone, diethyl fumarate, diethyl maleate, methylene diethyl malenate, dichlorovinylidene fluoride, dimethyl itaconate, diethyl itaconate, dibutyl itaconate, vinyl pyridine, maleic anhydride and allyl glycidyl ether. Light stabilizers such as tertiary-butyl salol and heat stabilizers such as tetrasodium pyrophosphate may also be incorporated into the composition. Also, a minor portion of a plasticizer may be added to the composition but care should be taken not to add an exces which will reduce the barrier characteristics of the composition. Other barrier compositions which may be used with benefit in a thermoplastic inner layer of this invention are vinyl chloride polymers which contain a predominant amount of vinyl chloride therein. Fluorocarbon polymers, fluorohydrocarbon polymers and fluorohalohydrocarbon polymers may also be used with benefit. Such thermoplastics as polyvinyl chloride, polyvinylidene fluoride, chlorinated polyethylene and polymers of such materials as vinylidene fluoride, vinylidene fluoride and chlorotrifluoroethylene, chlorotrifluoroethylene and vinylidene fluoride, chlorotrifluoroethylene and vinyl chloride, and chlorotrifluoroethylenevinylidene fluoride and tetrafluoroethylene might also be used.

The opposing thermoplastic inner layer is formed from comopsitions which adhere poorly to the first inner layer compositions described above but adhere well to a metal film. Compositions for this layer should be selected from combinations which have functional groups that promote good adhesion to metal but are not effective in promoting adhesion to the other inner layer. A composition of ethylene acrylic acid polymer is an example of the type of material required. The composition of ethylene acrylic acid polymer can vary from 3 to 30 weight percent acrylic acid and 70 to 97 weight percent ethylene. Three weight percent acrylic acid represents the amount needed to supply a minimum number of functional groups required for satisfactory adhesion of the composition to metal and 30 weight percent acrylic acid represents the maximum practical limit of an ethylene acrylic acid composition. Essentially maximum adhesion of the ethylene acrylic acid polymer to metal is obtained at about 16 weight percent acrylic acid and 84 weight percent ethylene. The poor adhesion to the other inner layer is not substantially increased by increasing the weight percent of acrylic acid.

The additional thermoplastic outer layers can vary widely in composition depending on the ultimate characteristics desired in the final composite film. An example of a composition that can be selected for the outer layers to provide for good heat sealing would be an ethylene vinyl acetate copolymer. The ethylene vinylacetate copolymer could have a range of composition from 8 to 35 weight percent vinyl-acetate and 65 to 92 weight percent ethylene. Also depending on the desired end use, this polymer would have a melt index range from 6 to 28.

Subsequent to the formation of the plastic layers to be included in the composite metallized film, the two inner layers are delaminated or separated and the interface surface of one inner layer is metallized to form a metal layer thereon. Metal layers useful in the practice of this invention are prepared by vacum vapor metallization, chemical vapor deposition, and sputtering. Thin foils such as silver leaf, gold leaf and the like are also used to provide the metal layers. Metals useful for forming the metal layers are of aluminum, nickel, zinc, chromium, copper, tin, lead and the like. Metal layers ranging from 10 to 10,000 angstroms, but preferably from 300 to 700 angstroms, can be deposited in accordance with the present invention.

After the inner surface of one inner thermoplastic layer has been metallized, the inner surface of the other inner thermoplastic layer is brought into contact with the metal layer and laminated thereto by heat and pressure or other means such as solvent sealing or welding. Since the two inner plastic layers characteristically adhere well to the metal layer, a laminated plastic to metal composite film results which is useful as a barrier structure or packaging material.

Accordingly, this invention has among its objects the provision of a process for making a thermoplastic metallic film useful as a packaging material or other structure where water vapor and/or gas barrier properties are needed which is accomplished separately or in conjunction with the formation of the thermoplastic layers included in the composite metallized film and which will reduce the losses during processing and the number of steps necessary to make the composite metallized film; and such other objects as will be apparent from the specification, drawings and claims.

BRIEF DESCRIPTION OF THE DRAWING

Referring to the accompanying drawing:

FIG. 1 is an exaggerated isometric view of a two-layer thermoplastic structure formed in the first step of the invention.

FIG. 2 is an exaggerated isometric view of an alternate embodiment of FIG. 1 and is a four-layer thermoplastic structure formed in the first step of the invention.

FIG. 3 is a schematic representation of an apparatus used to separate the thermoplastic layers into two webs, apply the metal layer and re-laminate the webs together to form the composite metallized film.

FIG. 4 is an exaggerated cross-sectional view of the final composite metallized film formed from the two-layer structure shown in FIG. 1.

FIG. 5 is an exaggerated cross-sectional view of the final composite metallized film formed from the four-layer structure shown in FIG. 2.

DESCRIPTION OF THE PREFERRED EMBODIMENTS

The following description illustrates the manner in which the principles of the invention are applied but are not to be construed as limiting the scope of the invention.

More specifically, a two-layer thermoplastic structure 10, shown in FIG. 1, is first co-extruded. The co-extrusion of thermoplastic structures is well known in the art and is typically illustrated by U.S. Patent No. 3,524,-795 issued to Norman R. Peterson. The alternative four-layer thermoplastic structure 20, shown in FIG. 2, can also be prepared by the aforesaid co-extrusion technique.

Structure 10 is composed of two layers 11 and 12 which adhere poorly to each other at their contacting interface 13. Structure 20 is composed of four thermoplastic layers 21, 22, 23 and 24. Layers 21 and 23, and 22 and 24 adhere well together to form webs 11′ and 12', respectively. Webs 11' and 12' adhere poorly to each other at their contacting interface 13'. All of the thermoplastic layers 11, 12, 21, 22, 23 and 24 can be formed to any desired thickness, but are all one mil thick as prepared here.

Thermoplastic layer 11 is a continuous coherent layer having a composition comprising 96 parts by weight of a copolymer of 85 weight percent vinylidene chloride and 15 weight percent vinyl chloride, 3 parts by weight of a copolymer of 67 weight percent ethylene and 33 weight percent vinyl-acetate having a melt index of 22–28 and a density at 23° C. of 0.957 and 1 part by weight of tetrasodium pyrophosphate. Thermoplastic layer 12 is a continuous coherent layer having a composition comprising 8 weight percent acrylic acid and 92 wegiht percent ethylene.

Referring to structure 20 of FIG. 2, thermoplastic layers 21 and 22 are identical in composition to thermoplastic layers 11 and 12, respectively, of structure 10 in FIG. 1. Thermoplastic layers 23 and 24 are continuous coherent layers of an ethylene vinyl-acetate copolymer having a composition in the proportions of 27 weight percent vinyl acetate and 73 weight percent ethylene and having a melt index of 6.

After the thermoplastic structure 10 or 20 is formed, a roll thereof is placed in the vacuum vapor metallizing apparatus 30 of FIG. 3 where a metal layer 39 is applied. First the structure 10 or 20 is placed on the unwind stand 32 and threaded through the equipment to the windup stand 38. A vacuum is then drawn on the chamber 31. Thereafter, as thermoplastic structure 10 or 20 advances through the equipment, it is first separated or delaminated into webs 34 and 35, as shown at 33 in FIG. 3. The separation or delamination takes place at the contacting interfaces 13 or 13', shown in FIGS. 1 and 2.

As web 34 advances, the metal film 39 is vapor deposited on the interface surface 41 thereof which is adjacent to the area of separation or delamination. The interface surface 41 of web 34 on which the metal film 39 is deposited can be formed by layer 11 or layer 12 but is herein formed by layer 11 which provides for good metal spreading and crystal growth without grain boundary defects during the deposition of the metal film 39. The vaporized metal forming the metal film 39 is aluminum and is supplied from the heated crucible 36 containing molten aluminum. The metal film 39 is deposited in a thickness of 600 angstroms.

After the metal film 39 has been deposited on the web 34, web 35 is brought into contact with the metal film 39 and laminated thereto by heat and pressure applied by rolls 37. The final result of laminating web 35 to the metal film 39 is a composite barrier film 40 or 50, shown in FIGS. 4 and 5. The composite barrier films 40 and 50 function satisfactorily during use because layers 11 and 12, and layers 21 and 22 adhere well to the metal film 39 and 39', respectively, even though they adhere poorly to each other during the first step of the above described process.

It is to be understood that the scope of this invention is not limited by the apparatus used to form the individual thermoplastic or metal layers. It is also to be understood that the scope of this invention is not limited to the thermoplastic and metal layers of specific combinations of chemical compositions, but that any suitable thermoplastic layers, which provide poorly adhering contacting interface surfaces to each other and which will individually adhere well to metal, can be used. It is further to be understood that the scope of this invention is not limited by the thickness and flexibility of the thermoplastic or metal layers. Thus while certain representative embodiments and details have been shown for the purpose of illustrating the invention, it will be apparent to those skilled in the art that various changes and modifications can be made therein without departing from the spirit and scope of the invention.

What is claimed is:

1. A method of making a composite barrier structure, comprising:
    (a) forming a laminated structure of at least two thermoplastic layers with contacting interface surfaces, which two layers are initially formed and immediately laminated together so as to maintain said surfaces essentially clean and free from foreign matter and which said surfaces characteristically adhere poorly to each other but individually adhere well to metal;
    (b) separating said laminated structure into two webs wherein each of said webs comprises one or more layers of thermoplastic material and said separating takes place between said two thermoplastic layers;
    (c) applying a metal layer to said interface surface of one of said thermoplastic layers; and
    (d) laminating said interface surface of the other of said two thermoplastic layers to said metal layer.

2. The method of claim 1 wherein said contacting interface surfaces of said two thermoplastic layers have a range of adhesion which at the lower end is just sufficient to hold said two thermoplastic layers together before the step of separating said structure and which at the upper end is just below an adhesion that will cause permanent deformation and/or loss of integrity of said webs during the step of separating said structure.

3. The method of claim 2 wherein said interface surfaces of said two thermoplastic layers adhere to said metal layer with an adhesion sufficient to make said composite barrier structure functional during use.

4. The method of claim 3 wherein said interface surfaces of said two thermoplastic layers adhere to one another to a substantially lesser degree than they adhere to said metal layer.

5. The method of claim 4 wherein one of said two thermoplastic layers is a continuous coherent layer of a polymer consisting essentially of at least 70 weight percent vinylidene chloride and at least one other olefinically unsaturated monomer copolymerizable therewith.

6. The method of claim 5 wherein the other of said two thermoplastic layers is a continuous coherent layer of a polymer consisting essentially of at least 3 weight percent acrylic acid and 97 weight percent ethylene.

7. The method of claim 1 wherein said metal layer is applied to said interface surface of one of said two thermoplastic layers by laminating a metal foil thereto.

8. The method of claim 1 wherein said metal layer is applied to said interface surface of one of said two thermoplastic layers by vacuum vapor metallization.

9. The method of claim 1 wherein said metal layer is applied to said interface surface of one of said two thermoplastic layers by chemical vapor deposition.

10. The method of claim 1 wherein said metal layer is applied to said interface surface of one of said two thermoplastic layers by sputtering.

11. The method of claim 1 wherein said metal layer has a thickness of from about 10 angstroms to about 10,000 angstroms.

12. The method of claim 1 wherein said layers remotely disposed from said contacting interface surfaces adhere securely to said two thermoplastic layers and provide good heat sealing, printability and appearance characteristics for said composite barrier structure.

13. The method of claim 1 wherein said layers remotely disposed from said contacting interface surfaces are continuous coherent layers of an ethylene vinyl acetate copolymer.

14. A method of preparing a composite barrier film comprising:
    (a) co-extruding a structure of at least two thermoplastic layers with contacting interface surfaces so as to maintain said surfaces esentially clean and free form foreign matter, which two layers characteristically adhere poorly to each other but individually adhere well to metal;

(b) delaminating said structure into two webs wherein each of said webs comprises one or more layers of thermoplastic material and said delaminating takes place between said two thermoplastic layers;

(c) vacuum vapor metallizing a metal layer onto said interface surface of one of said two thermoplastic layers; and (d) laminating said interface surface of the other of said two thermoplastic layers to said metal layer.

15. The method of claim 14 wherein said contacting interface surfaces of said two thermoplastic layers have a range of adhesion which at the lower end is just sufficient to hold said two thermoplastic layers together before the step of separating said structure and which at the upper end is just below an adhesion that will cause permanent deformation and/or loss of integrity of said webs during the step of delaminating said structure.

16. The method of claim 15 wherein said interface surfaces of said two thermoplastic layers adhere to said metal layer with and adhesion sufficient to make said composite barrier film functional during use.

17. The method of claim 16 wherein said interface surfaces of said two thermoplastic layers adhere to one another to a substantially lesser degree than they adhere to said metal layer.

18. The method of claim 17 wherein one of said two thermoplastic layers is a continuous coherent layer of a polymer consisting essentially of at least 70 weight percent vinylidene chloride and at least one other olefinically unsaturated monomer copolymerizable therewith.

19. The method of claim 18 wherein the other of said two thermoplastic layers is a continuous coherent layer of a polymer consisting essentially of at least 3 weight percent acrylic acid and 97 weight percent ethylene.

20. The method of claim 14 wherein said metal layer has a thickness of from about 10 angstroms to about 10,000 angstroms.

21. The method of claim 14 wherein said layers remotely disposed from said contacting interface surfaces adhere securely to said two thermoplastic layers and provide good heat sealing, printability and appearance characteristics for said composite barrier film.

22. The method of claim 14 wherein said layers remotely disposed from said contacting interface surfaces are continuous coherent layers of an ethylene vinyl-acetate copolymer.

References Cited
UNITED STATES PATENTS

| | | | |
|---|---|---|---|
| 2,951,774 | 9/1960 | Schrenk | 117—107.1 |
| 2,968,583 | 1/1961 | Barth | 117—107.1 |
| 3,194,706 | 7/1965 | Utschig | 156—152 |
| 3,408,240 | 10/1968 | Williams | 156—324 |
| 3,458,375 | 7/1969 | Williams | 156—328 |

JOHN DAVID WELSH, Primary Examiner

U.S. Cl. X.R.

156—152, 390; 117—107.1